J. PREATKA.
POWER APPARATUS.
APPLICATION FILED MAY 9, 1911.
1,006,272.
Patented Oct. 17, 1911.
3 SHEETS—SHEET 1.
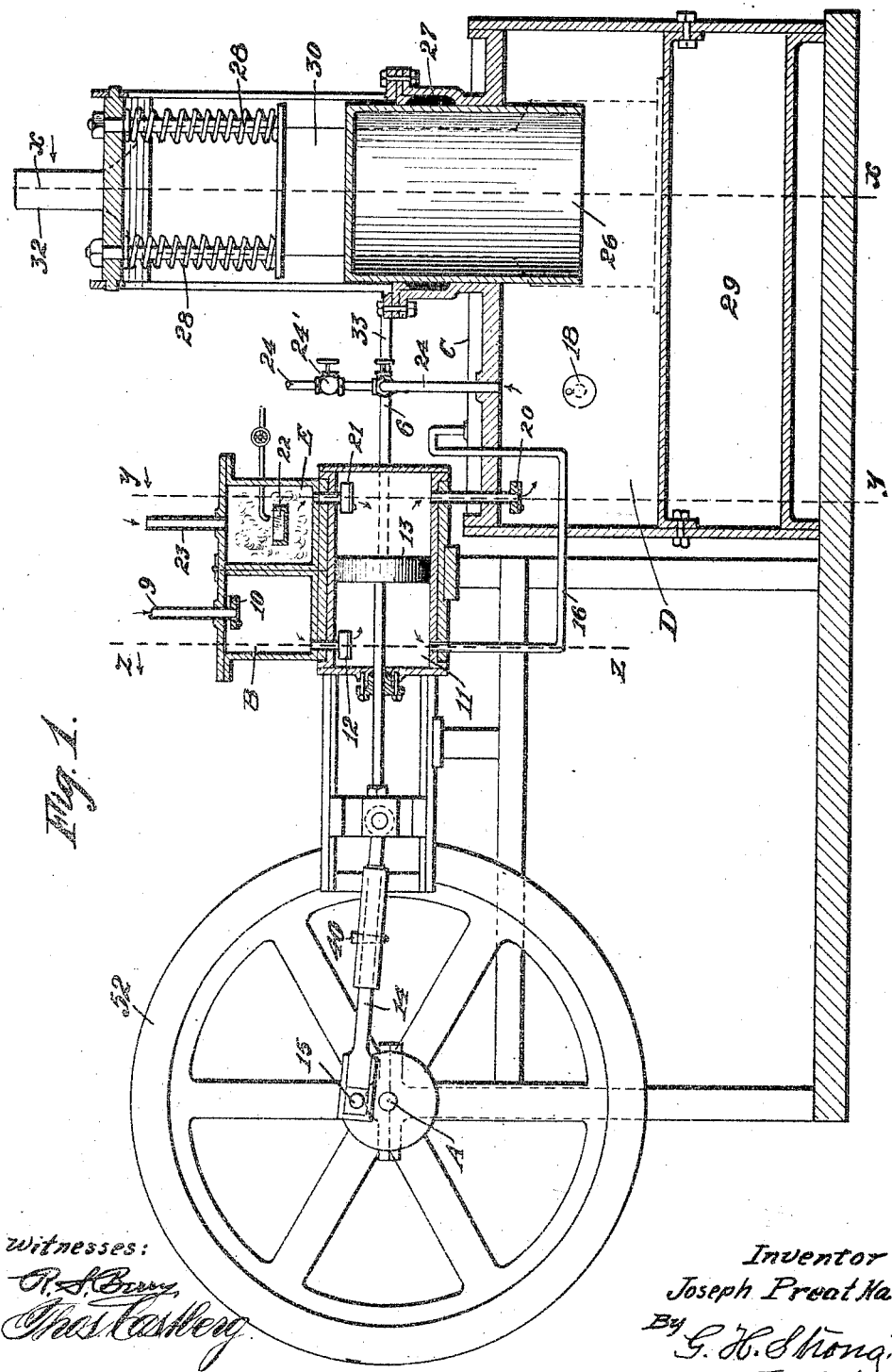
Witnesses:
Inventor
Joseph Preatka
By G. H. Strong,
His Atty.

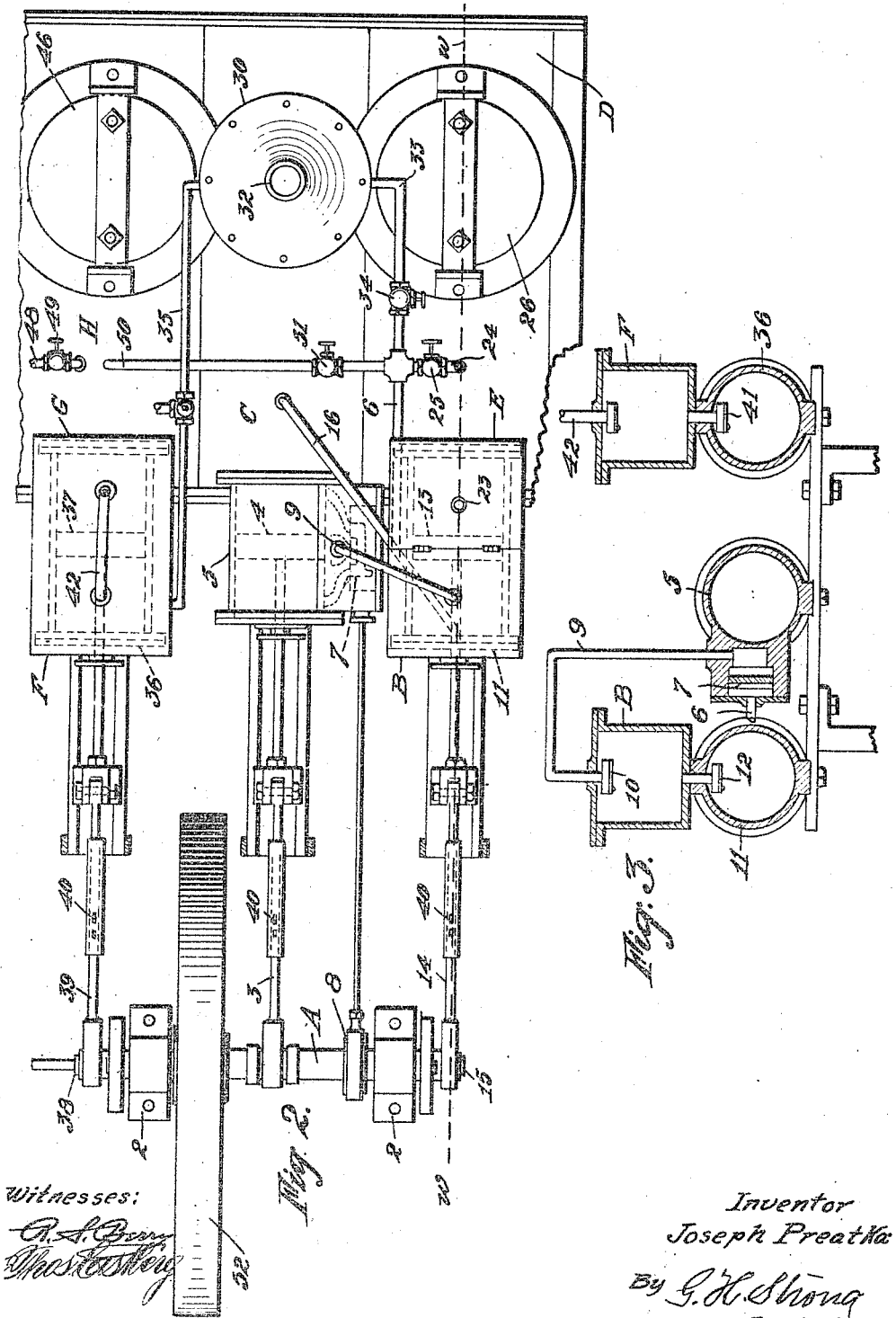

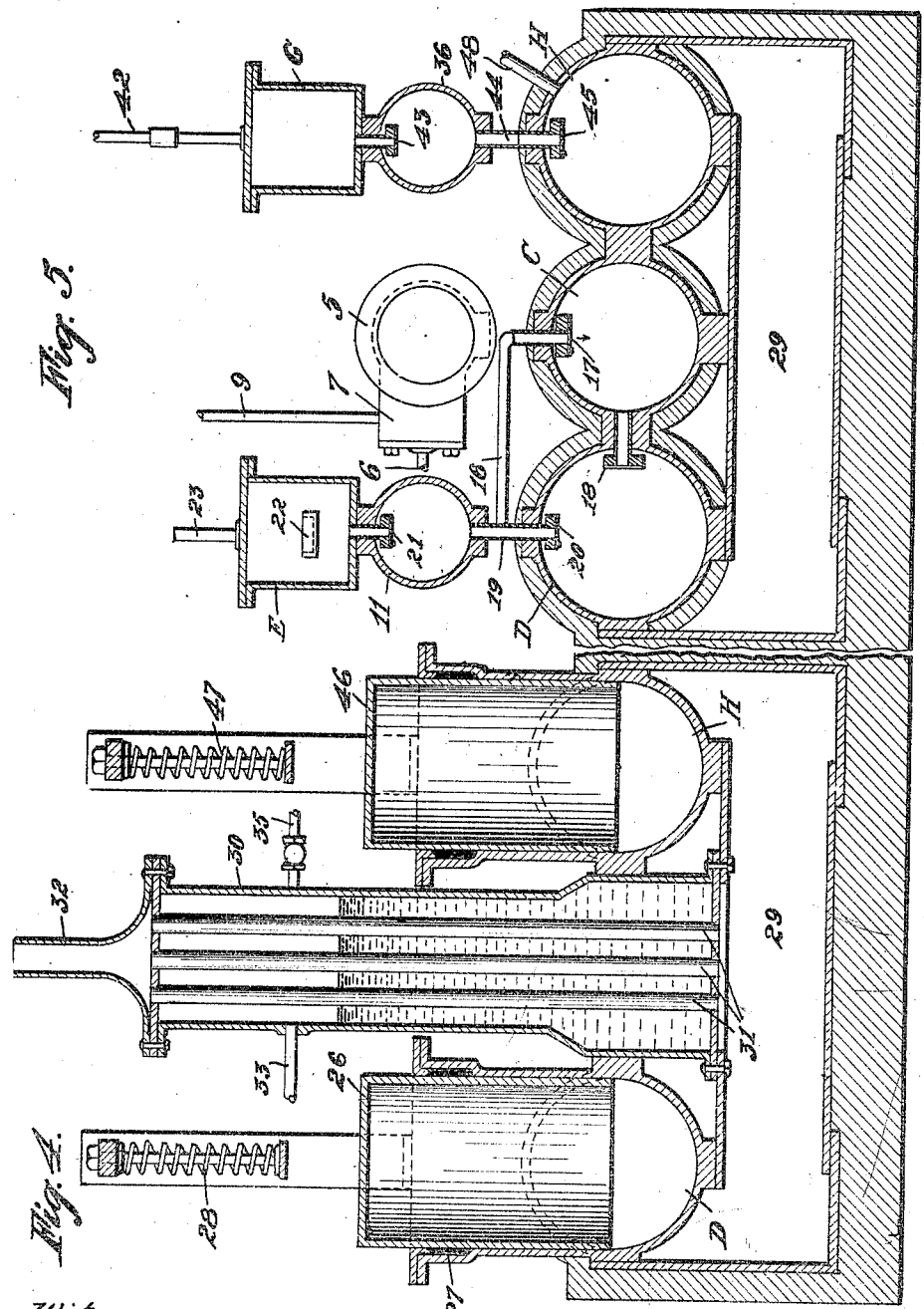

UNITED STATES PATENT OFFICE.

JOSEPH PREATKA, OF SAN FRANCISCO, CALIFORNIA.

POWER APPARATUS.

1,006,272.

Specification of Letters Patent.　　Patented Oct. 17, 1911.

Application filed May 9, 1911.　Serial No. 626,034.

*To all whom it may concern:*

Be it known that I, JOSEPH PREATKA, a subject of the Emperor of Austria-Hungary, residing in the city and county of San Francisco and State of California, have invented new and useful Improvements in Power Apparatus, of which the following is a specification.

This invention relates to a power plant, and particularly pertains to an apparatus for producing fluid pressure and mechanical energy.

It is the object of this invention to provide a power plant which is so designed and arranged as to store and conserve energy, and which is adapted to utilize the reserved power in operating the driving mechanism at suitable intervals.

The invention consists of the parts and the construction and combination of parts, as hereinafter more fully described and claimed, having reference to the accompanying drawings, in which—

Figure 1 is a vertical section of the invention on the line W—W, Fig. 2. Fig. 2 is a plan view with parts broken away. Fig. 3 is a cross section on the line Z—Z Fig. 1. Fig. 4 is a cross section on the line X—X Fig. 1. Fig. 5 is a cross section on the line Y—Y Fig. 1.

In the drawings A represents a drive shaft supported in bearings 2, which shaft is adapted to be rotated through a connecting rod 3 by means of a reciprocating engine, consisting of a piston 4 mounted in a cylinder 5; the piston 4 being arranged to be reciprocated by fluid pressure. The fluid pressure for operating the piston 4 is delivered to the cylinder 5 through a feed pipe 6, a D-valve 7, operated by an eccentric 8 on the shaft A, controlling the admission of the fluid pressure to either side of the piston 4 in the usual manner. The exhaust from the cylinder 5 is discharged through a pipe 9 which discharges into a reservoir B through a check valve 10.

The reservoir B is disposed above a cylinder 11 and communicates with the interior thereof through a check valve 12 at a point rearward of a piston 13, which is designed to be reciprocated in the cylinder 11 by means of a connecting rod 14, operated by a wrist-pin or crank 15 on the drive shaft A.

The piston 13 is designed to draw the exhausted fluids in the reservoir B into the cylinder 11 on its forward stroke, and to discharge them therefrom on its rearward stroke through a conduit 16, which delivers the fluids to the interior of a tank C through a check valve 17. The tank C communicates with a tank D through a check valve 18, which tank D is connected to the cylinder 11 in front of the piston 13 by means of a pipe 19; a check valve 20 on the pipe 19 opening into the tank D being provided to prevent the fluids in the tank D being drawn into the cylinder 11 on the back stroke of the piston 13 and at the same time admit of fluids being delivered to the tank D on the forward stroke of the piston 13.

The fluids to be delivered to the tank D by means of the piston 13 are drawn into the cylinder 11 on the back stroke of piston 13 from a chamber E, which is disposed above the cylinder 11 and communicates therewith through a check valve 21. The chamber E is provided for the purpose of producing heated air or gases which is accomplished by burning suitable fuel, preferably hydrocarbon liquids, in a pan 22 disposed in the chamber E. The lid of the chamber E is hinged to open so that a light may be applied to the combustible substances in the pan 22, a vent 23 in the lid being provided to admit air to the chamber E to displace that drawn therefrom by the piston 13.

The hot gases formed in the chamber E, being drawn into the cylinder 11 by the backward movement of the piston 13, are discharged into the tank D by the forward movement of the piston 13 where they mingle with the fluids exhausted from the engine cylinder 5 and which are forced into the tank D by the action of the piston 13.

Leading from the tank D is a pipe 24 which connects with the supply pipe 6 leading to the engine valve 7; a cut-off valve 25 being disposed in the pipe 24 for the purpose of admitting or cutting off the flow of the fluids collected under pressure in the tank D through the pipe 24 into the pipe 6, the pipe 24 also leading to any other suitable point of discharge through a regulating valve 24′.

Mounted in the tank D is a bell cylinder 26 which is slidable vertically and is guided in a packing gland 27, this bell being adapted to be lifted by the pressure of the fluids in the tank D so as to bear against and depress helical springs 28, mounted on a framework disposed above the bell 26.

As a means for maintaining the fluids in the tank D in the state of their maximum expansion, the tank D is disposed over a fire-box 29 in which fuel of any suitable description may be burned; the fires in the fire-box 29 heating the fluids in the tank D to a high temperature.

Mounted in the fire-box 29 is an ordinary vertical boiler 30, the fire tubes 31 of which lead from the fire-box 29 to a flue 32 through the usual water and steam space. Steam generated in the boiler 30 by the action of the fire in the fire box 29 is conducted through a pipe 33, in which a throttle valve 34 is mounted, to the supply pipe 6, from whence it passes to the D-valve 7 on the cylinder 5 to operate the engine piston 4 in the usual manner.

Water is delivered to the boiler 30 through a pipe 35, which leads to and connects with a pump cylinder 36 behind a piston 37 therein. This piston 37 is adapted to be reciprocated by means of a crank 38 on the drive shaft A and a rod 39 connecting the crank 38 to the piston-rod on the piston 37. The connecting rod 39 is formed of a pair of telescoping sections which are locked together by means of a wedge 40, which wedge is designed to be removed so as to throw the piston 37 out of operative connection with the shaft A when it is desired to cut off the water pumping operations.

The water to supply the boiler 30 is drawn into the cylinder 36 on the forward movement of the piston 37 from a reservoir F; a check valve 41 being disposed in the port leading to the interior of the cylinder 36 from the reservoir F to prevent back flow into the reservoir F on the backward movement of the piston 37.

Water is delivered to the reservoir F by means of a pipe 42 which leads from any suitable source of water supply and also connects with a reservoir G located above the cylinder 36, the interior of which reservoir G communicates with the interior of the cylinder 36 through a check-valve 43 at a point in front of the piston 37, so that the rearward movement of the piston 37 will draw water into the forward part of the cylinder 36. The water thus drawn into the cylinder on the back stroke of the piston 37 is discharged through a passage 44 and a checkvalve 45 into a tank H corresponding to the tank D, which is situated above the firebox 29 and is adapted to be heated by the action of the fire therein so as to raise the temperature of the water to any desired degree.

The tank H is provided with a bell cylinder 46, corresponding to the cylinder 26 in the tank G, which cylinder is adapted to be raised by the pressure of the water in the tank H so as to compress helical springs 47 mounted on a framework disposed above the tank H. The water thus retained under pressure in the tank H may be discharged through a pipe 48 as desired; a valve 49 being provided in the pipe 48 to open or close the pipe to the passage of the water in the tank H. A pipe 50 also leads from the tank H and connects with the supply pipe 6, as shown in Fig. 2, a cut-off valve 51 being disposed therein to permit or prevent the flow of water or other fluid through the pipes 50 and 6 to the engine valve 7.

In the operation of this invention steam is generated in the boiler 30, which is delivered to the engine cylinder 5 to reciprocate the piston 4, which in turn rotates the drive shaft A. This sets the pistons 13 and 37 in motion and thereby compresses heated air and gases in the tank D and pumps water into the tank H under pressure, from whence they may be drawn off and employed in any desired manner through the pipes 24 and 48 respectively. When it is desired to cut out either one or both of the air and water pumping operations, the connecting rods 14 and 39 are disconnected by the removal of wedges 40.

By storing air under pressure in the tank D through the medium of the steam pressure in the boiler 30, it will be readily seen that this fluid pressure in the tank D may be utilized for operating the engine piston 4 particularly at times when it is desired to draw off the steam from the boiler 30 for other purposes, or when the steam pressure falls short of that necessary to operate the piston 4.

It is obvious that the pump piston 37 may be employed for pumping air or gases or fluids, other than water, when desired, and that the tank H may be employed as a boiler to generate steam which may be delivered to the engine piston 4 to operate the latter through the pipe 50.

A pulley 52 is mounted on the shaft A from which power may be transmitted to operate machines of any desired character.

The exhaust of the engine, together with the hot gases generated in the chamber E, are compressed in the reservoir D only to a point at which the engine is capable under the initial pressure of the steam generated in the boiler 30; the gases then being drawn off through the valve 24' and pipe 24, Fig. 1, and are utilized for heating or other purposes. When the engine is to be shut down, the valve 24' is closed and the exhaust and gases are compressed to the highest degree possible, which is dependent upon the power of the engine. The pressure thus generated constitutes a reserve pressure which may be drawn off at any time and when utilized for starting the engine, as before mentioned, by delivering it thereto through the pipe 6, the exhaust of the engine will necessarily be opened to the atmosphere; it being obvious that the engine cannot force the exhaust into the reservoirs in opposition to the pressure therein. The engine will be operated from the reserve pressure in the tank D until the work of the engine and the reserve pressure reach a balance, whereupon steam from the boiler will be utilized to continue the operation of the engine.

Having thus described my invention, what I claim and desire to secure by Letters Patent, is—

1. In a power plant, the combination of a fluid pressure reciprocating engine, a drive shaft rotatable thereby, a piston reciprocated through said drive shaft, means by which the exhaust fluids from said engine will be compressed in a tank, means by which hot products of combustion mingled with air will be delivered by said piston under pressures into said tank, and heating means for expanding the fluids in said tank, the compressed fluids in said tank forming a reserve pressure.

2. In a power plant, the combination of a fluid pressure reciprocating engine, a drive shaft rotatable thereby, a piston reciprocated through said drive shaft, means by which the exhaust fluids from said engine will be compressed in a tank, means by which hot products of combustion mingled with air will be delivered by said piston under pressures into said tank, heating means for expanding the fluids in said tank the compressed fluids in said tank forming a reserve pressure, means for delivering the expanded fluid to the engine to operate the same, means for generating steam by said heating means, and means for delivering said steam to said engine to operate same.

3. In a power plant, the combination of a fluid pressure reciprocating engine, a drive shaft rotatable thereby, a piston reciprocated through said drive shaft, means by which the exhaust fluids from said engine will be compressed in a tank, means by which hot products of combustion mingled with air will be delivered by said piston under pressures into said tank, heating means for expanding the fluids in said tank the compressed fluids in said tank forming a reserve pressure, means for delivering the expanded fluid to the engine to operate the same, means for generating steam by said heating means, means for delivering said steam to said engine to operate same, pumping means operated through said drive shaft for pumping water, and a tank to receive the water, said tank subject to the action of the heating means.

4. In a power plant, the combination of a fluid pressure reciprocating engine, a drive shaft rotatable thereby, a piston reciprocated through said drive shaft, means by which the exhaust fluids from said engine will be compressed in a tank, means by which hot products of combustion mingled with air will be delivered by said piston under pressures into said tank, heating means for expanding the fluids in said tank the compressed fluids in said tank forming a reserve pressure, means for delivering the expanded fluid to the engine to operate the same, means for generating steam by said heating means, means for delivering said steam to said engine to operate same, pumping means operated through said drive shaft for pumping water, a tank to receive the water, said tank subject to the action of the heating means, and means for maintaining the fluids in the tanks under uniform pressures, said means consisting of spring members acting on a bell cylinder in each tank.

In testimony whereof I have hereunto set my hand in the presence of two subscribing witnesses.

JOSEPH PREATKA.

Witnesses:
CHARLES EDELMAN,
C. C. COOK.